United States Patent
Kim

(10) Patent No.: US 10,381,126 B2
(45) Date of Patent: Aug. 13, 2019

(54) POSITIVE ELECTRODE FOR RECHARGEABLE LITHIUM BATTERY AND RECHARGEABLE LITHIUM BATTERY INCLUDING SAME

(75) Inventor: Jin-Bum Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 556 days.

(21) Appl. No.: 12/684,868

(22) Filed: Jan. 8, 2010

(65) Prior Publication Data

US 2010/0209776 A1 Aug. 19, 2010

(30) Foreign Application Priority Data

Feb. 13, 2009 (KR) .................. 10-2009-0011969

(51) Int. Cl.
*H01M 4/04* (2006.01)
*H01M 4/13* (2010.01)
*H01M 4/52* (2010.01)
*H01M 4/62* (2006.01)
*H01B 1/24* (2006.01)
*H01M 4/131* (2010.01)
*H01M 4/139* (2010.01)
*H01M 4/525* (2010.01)
*H01M 10/0525* (2010.01)

(52) U.S. Cl.
CPC ............ *H01B 1/24* (2013.01); *H01M 4/0404* (2013.01); *H01M 4/131* (2013.01); *H01M 4/139* (2013.01); *H01M 4/525* (2013.01); *H01M 4/621* (2013.01); *H01M 4/624* (2013.01); *H01M 10/0525* (2013.01)

(58) Field of Classification Search
None
See application file for complete search history.

(56) References Cited

U.S. PATENT DOCUMENTS 6,416,902 B1    7/2002   Miyasaka
7,344,802 B2 *  3/2008   Fujimoto et al. ............. 429/217
(Continued)

FOREIGN PATENT DOCUMENTS

JP   2001-266853 A     9/2001
JP   2003-045414   *   2/2003   .............. H01M 4/02
(Continued)

OTHER PUBLICATIONS

Korean Office action dated Jan. 17, 2011 issued to corresponding application No. KR 10-2009-0011969 A, listing the cited reference in this IDS.

(Continued)

*Primary Examiner* — Jonathan Crepeau
*Assistant Examiner* — Angela J Martin
(74) *Attorney, Agent, or Firm* — Lewis Roca Rothgerber Christie LLP

(57) ABSTRACT

A positive electrode for a rechargeable lithium battery and a rechargeable lithium battery including the same. The positive electrode includes a positive active material, a binder, and a conductive material, wherein a weight ratio of the binder and conductive material, and the positive active material, ranges from 3:97 to 5:95 wt %, and a weight ratio of the binder and the conductive material ranges from 1.5 to 3:1.

10 Claims, 2 Drawing Sheets

(56) References Cited

U.S. PATENT DOCUMENTS

| | | | |
|---|---|---|---|
| 7,811,708 B2* | 10/2010 | Lampe-Onnerud | H01M 4/364 29/623.1 |
| 8,415,058 B2* | 4/2013 | Sakata | H01M 4/13 429/223 |
| 2003/0180617 A1* | 9/2003 | Fujimoto | H01M 4/505 429/231.1 |
| 2004/0072073 A1 | 4/2004 | Okochi et al. | |
| 2004/0157125 A1 | 8/2004 | Takatsuji et al. | |
| 2005/0238958 A1* | 10/2005 | Kim | H01M 4/13 429/217 |
| 2005/0271940 A1* | 12/2005 | Fukunaga | H01M 4/04 429/217 |
| 2006/0099495 A1* | 5/2006 | Suzuki | H01M 2/021 429/128 |
| 2007/0054191 A1 | 3/2007 | Shirane et al. | |
| 2008/0268343 A1* | 10/2008 | Sato | C23C 14/24 429/231.95 |
| 2008/0299457 A1 | 12/2008 | Muraoka et al. | |
| 2009/0061304 A1 | 3/2009 | Muraoka et al. | |
| 2009/0117469 A1* | 5/2009 | Hiratsuka et al. | 429/231.8 |
| 2009/0263707 A1* | 10/2009 | Buckley | H01M 2/1653 429/94 |
| 2010/0015521 A1* | 1/2010 | Kim | C01G 45/1228 429/163 |

FOREIGN PATENT DOCUMENTS

| | | |
|---|---|---|
| JP | 2005-197004 | 7/2005 |
| JP | 2005-302338 | 10/2005 |
| JP | 2006-107845 | 4/2006 |
| JP | 2007-188703 | 7/2007 |
| KR | 10-2003-0076431 | 9/2003 |
| KR | 10-2004-0046667 | 6/2004 |
| KR | 10-2006-0108110 | 10/2006 |
| KR | 10-2006-0134631 | 12/2006 |
| KR | 10-2007-0060784 | 6/2007 |
| KR | 10-2007-0082551 A | 8/2007 |
| KR | 10-2007-009072 A | 10/2007 |
| KR | 10-2007-0097072 | 10/2007 |
| KR | 10-2007-0109854 A | 11/2007 |
| WO | WO 2007/129860 A1 | 11/2007 |
| WO | WO 2008/138003 A1 * | 11/2008 ............ H01M 4/58 |
| WO | WO 2009/060603 A1 | 5/2009 |

OTHER PUBLICATIONS

English Machine Translation of JP 2001-266853 A, 6 pages.
Korea Office Action dated Mar. 26, 2012 corresponding to 10-2009-0011969, 5 pages.
KIPO Office action dated Jan. 17, 2011, for Korean Patent application 10-2009-0013942, (3 pages).
European Search Report dated Feb. 16, 2011, for European Patent application 10250272.1, (8 pages).
KIPO Notice of Allowance dated Sep. 26, 2011, for Korean Patent application 10-2009-0013942, (5 pages).
European Office action dated Feb. 7, 2012, for European Patent application 10250272.1, (6 pages).
U.S. Office action dated Aug. 6, 2012, for cross reference U.S. Patent application (66170), (18 pages).
Patent Abstracts of Japan, and English machine translation of Japanese Publication 2006-107845 listed above, (30 pages).
U.S. Office action dated Feb. 19, 2013, for cross reference U.S. Appl. No. 12/650,910, (19 pages).
U.S. Office action dated Jun. 17, 2014, for cross reference U.S. Appl. No. 12/650,910, (11 pages).
U.S. Office action dated Sep. 12, 2013, for cross reference U.S. Appl. No. 12/650,910, (17 pages).
U.S. Office action dated Dec. 6, 2013, for cross reference U.S. Appl. No. 12/650,910, (3 pages).
U.S. Office action dated Dec. 18, 2014, for cross reference U.S. Appl. No. 12/650,910, (14 pages).
U.S. Advisory dated Mar. 24, 2015, for cross reference U.S. Appl. No. 12/650,910, (6 pages).
U.S. Office action dated Jun. 5, 2015, for cross reference U.S. Appl. No. 12/650,910, (17 pages).
U.S. Office action dated Oct. 19, 2015, for cross reference U.S. Appl. No. 12/650,910, (16 pages).
U.S. Office action dated Mar. 16, 2016, for cross reference U.S. Appl. No. 12/650,910, (22 pages).
U.S. Office action dated Aug. 11, 2016, for cross reference U.S. Appl. No. 12/650,910, (30 pages).

* cited by examiner

POSITIVE ELECTRODE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2009-0011969, filed in the Korean Intellectual Property Office, on Feb. 13, 2009, the entire content of which is incorporated herein by reference.

BACKGROUND OF THE INVENTION

1. Field of the Invention

The present invention relates to a positive electrode for a rechargeable lithium battery and a rechargeable lithium battery including the same. More particularly, the present invention relates to a positive electrode for a rechargeable lithium battery having long cycle life characteristics, and a rechargeable lithium battery including the same.

2. Description of the Related Art

Lithium rechargeable batteries utilize an organic electrolyte solution and typically have twice the discharge voltage of conventional batteries utilizing an alkali aqueous solution, and accordingly have high energy density. As such, lithium rechargeable batteries have recently drawn a lot of attention as power sources for electronic devices, such as small portable electronic devices.

As for negative active materials of a rechargeable lithium battery, various carbon-based materials such as artificial graphite, natural graphite, and hard carbon, which can all intercalate and deintercalate lithium ions, have been used.

For positive active materials, composite metal oxides such as $LiCoO_2$, $LiMn_2O_4$, $LiNiO_2$, $LiNi_{1-x}Co_xO_2$ ($0<x<1$), $LiMnO_2$, and the like have been researched for use.

Of the positive active materials, a cobalt-based positive active material such as $LiCoO_2$ has good electric conductivity, high battery voltage, and excellent electrode characteristics. However, $LiCoO_2$ is relatively expensive.

Manganese-based positive active materials such as $LiMn_2O_4$ or $LiMnO_2$ are easier to synthesize than $LiCoO_2$, are less costly than the other materials, and are environmentally friendly. However, these manganese-based materials have relatively low battery capacity.

A nickel-based positive active material such as $LiNiO_2$ is currently the least costly of the positive active materials mentioned above, and has a high discharge capacity. Therefore, it has been actively researched. However, such a nickel-based positive active material has low cycle life characteristics and low heat capacity.

SUMMARY OF THE INVENTION

An aspect of an embodiment of the present invention is directed toward a positive electrode for a rechargeable lithium battery having long cycle life characteristics, particularly cycle life characteristics at low temperatures.

Another aspect of an embodiment of the present invention is directed toward a rechargeable lithium battery including the positive electrode.

Aspects of embodiments of the present invention are not limited to the above technical purposes.

According to an embodiment of the present invention, a positive electrode for a rechargeable lithium battery includes a positive active material, a binder, and a conductive material, wherein a weight ratio of the binder and conductive material (the mixed binder and conductive material), and the positive active material, ranges from 3:97 to 5:95 wt %, and a weight ratio of the binder and the conductive material ranges from 1.5 to 3:1.

According to another embodiment of the present invention, a rechargeable lithium battery is provided to include the above positive electrode, a negative electrode including a negative active material, and a non-aqueous electrolyte.

Here, in one embodiment of the present invention, the positive electrode for the rechargeable lithium battery has high battery capacity and long cycle life, particularly cycle life at a low temperature.

Hereinafter, further embodiments of the present invention will be described in more detail.

DETAILED DESCRIPTION

Figure 1:
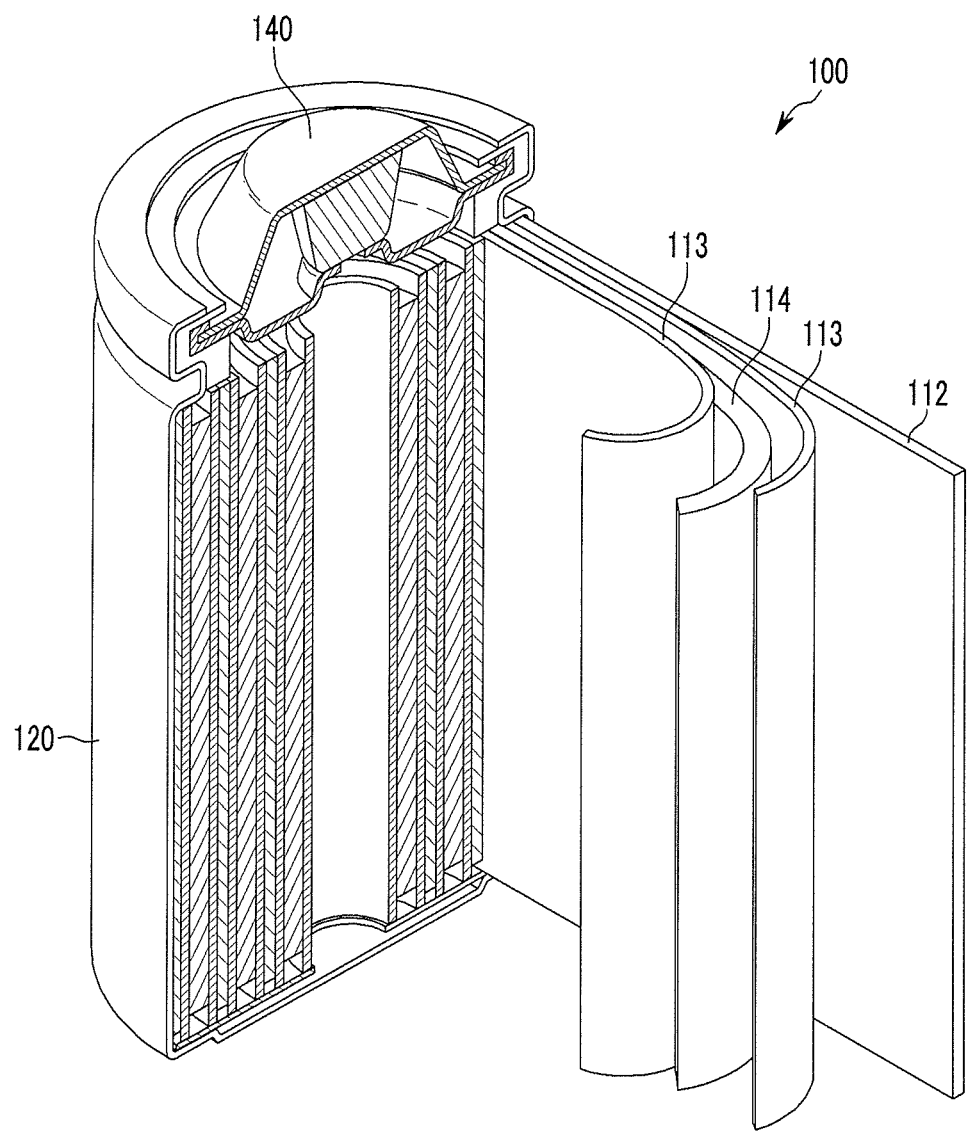
FIG. 1 is a schematic view of a representative structure of a rechargeable lithium battery.

Exemplary embodiments of the present invention will hereinafter be described in more detail. However, these embodiments are only exemplary, and the present invention is not limited thereto.

The positive electrode for a rechargeable lithium battery according to an embodiment of the present invention includes a positive active material, a binder, and a conductive material. A weight ratio of the binder and conductive material (the mixed binder and conductive material), and the positive active material, ranges from 3:97 to 5:95 wt %. In one embodiment, when the weight ratio of the mixed binder and conductive material, and the positive active material is out of the above described range, the battery capacity is decreased, the conductivity of the positive electrode is deteriorated, and/or the adhesive strength between the active material and current collector is deteriorated. Thereby, it causes problems in that the cycle life characteristics are degraded or it is hard to fabricate the battery.

In addition, the weight ratio of the binder and the conductive material may range from 1.5 to 3:1, and in one embodiment, it ranges from 1.6 to 2:1. In one embodiment, when the weight ratio of binder and conductive material is out the range, in other words, when the binder is added at less than 1.5 times with respect to the weight amount of conductive material, cycle life characteristics at low temperatures are deteriorated; however, when the binder is added at more than three times with respect to the weight amount of conductive material, the adhesive strength to the electrode plate is deteriorated, and the battery capacity is decreased.

As described above, in one embodiment, it is possible to improve the capacity characteristics and cycle life characteristics, particularly, cycle life characteristics at low temperatures, by adjusting the weight ratio of the mixed binder and conductive material, and the positive active material, and further controlling the weight ratio of the binder and the conductive material.

Particularly, the effects on improving the battery capacity characteristics and the cycle life characteristics that are obtained by manipulating the amount of components constituting the positive electrode are unexpectedly and/or more effectively obtained by utilizing a compound represented by the following Formula 1 as a positive active material:

　　　　　Formula 1 wherein M is $M'_{1-k}A_k$, M' is $Ni_{1-a-b}(Ni_{1/2}Mn_{1/2})_aCo_b$, 0.65≤a+b≤0.85, and 0.1≤b≤0.4, A is a dopant, 0≤k<0.05, 0.95≤x≤1.05, x+y≈2, and 0≤z≤0.05.

In Formula 1, "x+y≈2" means "x+y is about 2".

The binder improves binding properties of the positive active material particles to each other and to a current collector. Non-limiting examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

Any electrically conductive material may be used as a conductive material if it provides conductivity and does not cause a chemical change. Non-limiting examples of the conductive material include natural graphite, artificial graphite, carbon black, acetylene black, ketjen black, a carbon fiber, a metal powder or a metal fiber including copper, nickel, aluminum, silver, and so on, a polyphenylene derivative, or mixtures thereof.

The positive electrode may be fabricated as follows: a positive active material composition is prepared by mixing the active material, a binder, and a conductive agent to form a composition for an active material layer, and then the composition for the active material layer is coated on a current collector. Then, a positive electrode can be suitably fabricated. The solvent may include N-methylpyrrolidone, but it is not limited thereto. The current collector may be Al, but is not limited thereto.

According to another embodiment of the present invention, a rechargeable lithium battery including the positive electrode, a negative electrode including a negative active material, and a non-aqueous electrolyte is provided. In the positive electrode, the weight ratio of the mixed binder and conductive material, and the positive active material, ranges from 3:97 to 5:95 wt %. In addition, the weight ratio of the binder and the conductive material ranges from 1.5 to 3:1, and in one embodiment, it ranges from 1.6 to 2:1.

In the rechargeable lithium battery, the weight ratio of the mixed binder and conductive material, and the positive active material; and the weight ratio of the binder and the conductive material, may be measured by thermogravimetric analysis (TGA) after being fabricated. The thermogravimetric analysis may be carried out by separating the positive active material layer from the current collector, washing it with a solvent such as dimethyl carbonate, drying it, and monitoring the weight change while increasing the temperature. The speed of increasing the temperature may be appropriately controlled depending upon the dissolving temperature of the used binder by utilizing a suitable method. The measured values are differentiated and illustrated in a graph. The graph has two peaks in which the decrease of weight at the beginning part of the temperature increase indicates a weight ratio of a binder with respect to the entire weight of the positive active material, the conductive material, and the binder; and the weight decrease after 40 minutes indicates a weight ratio of the conductive material with respect to the other materials.

The negative electrode includes a current collector and a negative active material layer disposed thereon, and the negative active material layer includes a negative active material.

The negative active material includes a carbon-based material that reversibly intercalates and deintercalates lithium ions. The carbon-based material may be any suitable carbon-based negative active material utilized in a lithium ion rechargeable battery. Non-limiting examples of the carbon material include crystalline carbon, amorphous carbon, and mixtures thereof. The crystalline carbon may be non-shaped, or may be sheet, flake, spherical, or fiber shaped natural graphite or artificial graphite. The amorphous carbon may be a soft carbon (carbon obtained by sintering at a low temperature), a hard carbon (carbon obtained by sintering at a high temperature), mesophase pitch carbide, fired coke, and so on.

The negative active material layer includes a binder, and optionally a conductive material. Although the negative active material, the binder, and the conductive material included in the negative active material layer have the composition of the positive composition according to one embodiment, it does not improve the capacity and cycle life characteristics. The composition thereof may be determined in an appropriate ratio.

The binder improves binding properties of the negative active material particles to each other and to a current collector. Non-limiting examples of the binder include polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material is included to improve electrode conductivity. Any suitable electrically conductive material may be used as a conductive material unless it causes a chemical change. Non-limiting examples of the conductive material include natural graphite, artificial graphite, carbon black, acetylene black, ketjen black, a carbon fiber, a metal powder or a metal fiber including copper, nickel, aluminum, silver, and so on, a polyphenylene derivative, or mixtures thereof.

The current collector may be a copper foil, a nickel foil, a stainless steel foil, a titanium foil, a nickel foam, a copper foam, a polymer substrate coated with a conductive metal, or combinations thereof.

The negative electrode may be fabricated by a method including mixing the active material, a conductive material, and a binder to provide a negative active material composition, and coating the composition on a current collector. Then, a negative electrode can be suitably fabricated. The solvent can be N-methylpyrrolidone, but it is not limited thereto.

The non-aqueous electrolyte includes a non-aqueous organic solvent and a lithium salt.

The non-aqueous organic solvent acts as a medium for transmitting ions taking part in the electrochemical reaction of the battery.

The non-aqueous organic solvent may include a carbonate-based, ester-based, ether-based, ketone-based, alcohol-based, or aprotic solvent. Non-limiting examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Non-limiting examples of the ester-based solvent include methyl acetate, ethyl acetate, n-propyl acetate, dimethylacetate, methylpropionate, ethylpropionate, γ-butyrolactone, decanolide, valerolactone, mevalonolactone, caprolactone, and so on. Non-limiting examples of the ether-based solvent include dibutyl ether, tetraglyme, diglyme, dimethoxyethane, 2-methyltetrahydrofuran, tetrahydrofuran, and so on, and non-limiting examples of the ketone-based solvent include cyclohexanone and so on. Non-limiting examples of the alcohol-based solvent include ethyl alcohol, isopropyl alcohol, and so on, and non-limiting examples of the aprotic solvent include nitriles such as R—CN (wherein R is a C2 to C20 linear, branched, or cyclic hydrocarbon, a double bond, an aromatic ring, or an ether bond), amides such as dimethylformamide, dioxolanes such as 1,3-dioxolane, sulfolanes, and so on.

The non-aqueous organic solvent may be used singularly or in a mixture. When the organic solvent is used in a mixture, the mixture ratio can be controlled in accordance with a desirable battery performance.

The carbonate-based solvent may include a mixture of a cyclic carbonate and a linear carbonate. The cyclic carbonate and the chain carbonate are mixed together in the volume ratio of 1:1 to 1:9, and when the mixture is used as an electrolyte, the electrolyte performance may be enhanced.

In addition, the electrolyte of the present invention may further include mixtures of carbonate-based solvents and aromatic hydrocarbon-based solvents. The carbonate-based solvents and the aromatic hydrocarbon-based solvents are, in one embodiment of the present invention, mixed together in the volume ratio of 1:1 to 30:1.

The aromatic hydrocarbon-based organic solvent may be represented by the following Formula 2.

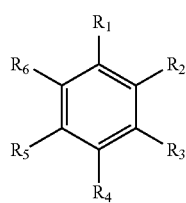

Formula 2 wherein $R_1$ to $R_6$ are independently hydrogen, a halogen, a C1 to C10 alkyl, a C1 to C10 haloalkyl, or combinations thereof.

The aromatic hydrocarbon-based organic solvent may include, but is not limited to, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2, 4-triiodotoluene, xylene, or combinations thereof.

The non-aqueous electrolyte may further include vinylene carbonate or an ethylene carbonate-based compound of the following Formula 3.

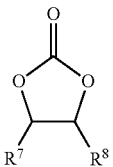

Formula 3 wherein $R_7$ and $R_8$ are independently hydrogen, a halogen, a cyano (CN), a nitro ($NO_2$), and a C1 to C5 fluoroalkyl, provided that at least one of $R_7$ and $R_8$ is a halogen, a nitro ($NO_2$), or a C1 to C5 fluoroalkyl and $R_7$ and $R_8$ are not simultaneously (or concurrently) hydrogen.

The ethylene carbonate-based compound includes difluoroethylene carbonate, chloroethylene carbonate, dichloroethylene carbonate, bromoethylene carbonate, dibromoethylene carbonate, nitroethylene carbonate, cyanoethylene carbonate, and/or fluoroethylene carbonate. The use amount of the additive for improving cycle life may be adjusted within a suitable range. However, in one embodiment, it may be included in an amount of 1 to 10 parts by weight based on 1 to 10 parts by weight of the non-aqueous organic solvent.

The lithium salt supplies lithium ions in the battery, and operates a basic operation of a rechargeable lithium battery and improves lithium ion transport between positive and negative electrodes. Non-limiting examples of the lithium salt include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, and $LiB(C_2O_4)_2$ (lithium bisoxalate borate, LiBOB), and combinations thereof. The lithium salt may be used at about 0.1 to 2.0M concentration. In one embodiment, when the lithium salt is included at the above concentration range, electrolyte performance and lithium ion mobility may be enhanced due to favorable electrolyte conductivity and viscosity.

The rechargeable lithium battery may further include a separator between a negative electrode and a positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, or coin-type batteries, and may be thin film batteries or batteries that are relatively bulky in size.

FIG. 1 is a schematic view of a representative structure of a rechargeable lithium battery. FIG. 1 illustrates a rechargeable lithium battery 100, which includes a negative electrode 112, a positive electrode 114, a separator 113 interposed between the negative electrode 112 and the positive electrode 114, a flame retardant electrolyte solution impregnating the separator 113, a battery case 120, and a sealing member 140 sealing the battery case 120. The negative electrode 112, the positive electrode 114, and the separator 113 are sequentially stacked, spirally wound, and placed in a battery case 120 to fabricate the rechargeable lithium battery 100.

The following examples illustrate the present invention in more detail. These examples, however, should not be construed as limiting the scope of the present invention.

Examples 1 to 4 and Comparative Examples 1 to 6

A positive active material of $LiNi_{0.5}Co_{0.2}Mn_{0.3}O_2$, a binder of polyvinylidene fluoride, and a conductive material of carbon black were mixed in a solvent of N-methylpyrrolidone in a composition ratio shown in the following Table 1 to provide a positive active material slurry. The positive active material slurry was coated on an Al-foil current collector to provide a positive electrode in accordance with a suitable positive electrode manufacturing method.

A negative active material of artificial graphite, a binder of polyvinylidene fluoride, and a conductive material of carbon black were mixed in a solvent of N-methylpyrrolidone in a ratio of 94:3:3 wt % to provide a negative active material slurry. The negative active material slurry was coated on a Cu-foil current collector to provide a negative electrode in accordance with a suitable negative electrode manufacturing process.

With the positive electrode, the negative electrode, and a non-aqueous electrolyte, a rechargeable lithium cell was fabricated in accordance with a suitable rechargeable lithium cell manufacturing process. The non-aqueous electrolyte was prepared by adding fluoroethylene carbonate in a 1.3M $LiPF_6$-dissolved mixed solvent in which ethylene carbonate, ethylmethyl carbonate, and dimethyl carbonate were mixed in a 2:2:6 volume ratio. The fluoroethylene carbonate was added at 5 parts by weight based on 100 parts by weight of the mixed solvent.

Each rechargeable lithium cell (theoretical capacity: 2350 mAh) obtained from Examples 1 to 4 and Comparative Examples 1 to 6 was measured to determine a discharge capacity and a cycle life characteristic at a low temperature, and the results are shown in the following Table 1. As shown in Table 1, the cycle life characteristic at low temperatures was determined by charging and discharging the rechargeable lithium cell at 0.8 C charge and 0.5 C discharge at 5° C. for 50 cycles and measuring the discharge capacity. In the following Table 1, ○ indicates "good" or a good final result, and X indicates "poor" or a poor final result.

TABLE 1

| | Positive active material (wt %) | Binder (wt %) | Conductive material (wt %) | Capacity (mAh) | Low temperature cycle life (mAh) | Level |
|---|---|---|---|---|---|---|
| Comparative Example 1 | 93 | 3.5 | 3.5 | 2325 | 1324 | X |
| Comparative Example 2 | 94 | 3 | 3 | 2348 | 886 | X |
| Comparative Example 3 | 95 | 2.5 | 2.5 | 2382 | 1216 | X |
| Example 1 | 95 | 3 | 2 | 2377 | 1614 | ○ |
| Example 2 | 96 | 3 | 1 | 2416 | 1716 | ○ |
| Example 3 | 96 | 2.5 | 1.5 | 2416 | 1814 | ○ |
| Comparative Example 4 | 96 | 2 | 2 | 2405 | 1432 | X |
| Comparative Example 5 | 96 | 1 | 3 | 2413 | 1356 | X |
| Example 4 | 97 | 2 | 1 | 2425 | 1893 | ○ |
| Comparative Example 6 | 98 | 1.5 | 0.5 | 2370 | 964 | X |

As shown in Table 1, it is confirmed that the rechargeable lithium cells according to Examples 1 to 4 that include 95 to 97 wt % of positive active material and 3 to 5 wt % of a mixed binder and conductive material, wherein the binder was mixed with the conductive material in a weight ratio ranging from 1.5 to 3:1, had high battery capacity and cycle life characteristics, providing satisfactory final results.

On the other hand, the lithium rechargeable cell according to Comparative Example 1 in which the positive active material was added in a relatively small amount such as 93 wt %, and the weight ratio of binder and conductive material was 1:1, had a low capacity; and the lithium rechargeable cell according to Comparative Example 2 in which the positive active material was added at 94 wt %, and the weight ratio of binder and conductive material was 1:1, had significantly deteriorated cycle life characteristics.

In addition, the cases of Comparative Examples 3 to 5 in which the positive active material was added at 95 to 97 wt %, and the weight ratio of binder and conductive material was 1:1 or 1:3, the cycle life characteristic was deteriorated.

Furthermore, in the case of Comparative Example 6 in which the positive active material was added at an excessive weight of 98 wt %, the binder and the conductive material were mixed in a weight ratio of 3:1, which could provide a good capacity characteristic, but this also significantly deteriorated cycle life characteristics.

Figure 2:
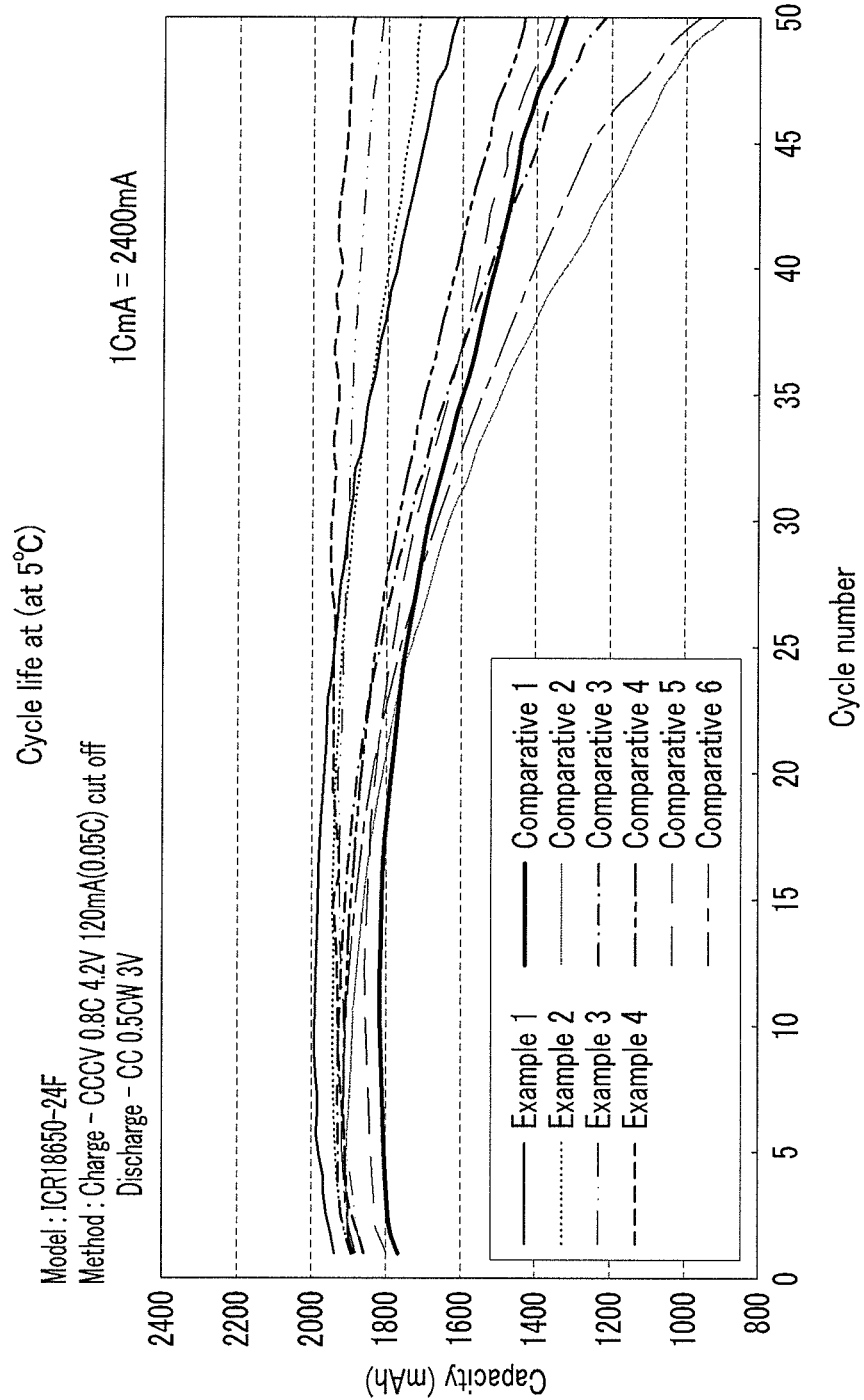
FIG. 2 shows cycle life characteristics of the rechargeable lithium battery cells according to Examples 1 to 4 of the present invention and Comparative Examples 1 to 6.

Furthermore, the rechargeable lithium cells according to Examples 1 to 4 and Comparative Examples 1 to 6 were charged at 0.8 C to 4.2 V under the condition of constant current-constant voltage and 120 mA (0.05 C) and discharged at 0.5 C to 3 V in a constant current mode, and the charge and discharge was repeated at 5° C. for 50 cycles. The discharge capacities depending on each cycle are shown in FIG. 2. As shown in FIG. 2, the rechargeable lithium cells according to Examples 1 to 4 substantially maintained the initial capacity after about 20 repeating charge and discharge cycles. By contrast, the rechargeable lithium cells according to Comparative Examples 1 to 6 had significantly deteriorated initial capacity after about 20 repeating charge and discharge cycles.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A positive electrode for a rechargeable lithium battery, comprising:
   a positive active material;
   a binder; and
   a conductive material,
   wherein a weight ratio of the binder and conductive material to the positive active material, ranges from 3:97 to 4:96, and
   a weight ratio of the binder to the conductive material ranges from 1.6 to 2:1, and
   wherein the positive active material satisfies the following:

$$Li_xM_yO_{2-z}$$

wherein M is $Ni_{1-a-b}(Ni_{1/2}Mn_{1/2})_aCo_b$, $0.65 \leq a+b \leq 0.85$, and $0.1 \leq b \leq 0.4$,
   $0.95 \leq x \leq 1.05$,
   $x+y \approx 2$, and
   $0 \leq z \leq 0.05$.

2. The positive electrode of claim 1, wherein the binder comprises a material selected from the group consisting of polyvinylalcohols, carboxylmethylcelluloses, hydroxypropylcelluloses, diacetylcelluloses, polyvinylchlorides, carboxylated polyvinylchlorides, polyvinylfluorides, ethylene oxide-containing polymers, polyvinylpyrrolidones, polyurethanes, polytetrafluoroethylenes, polyvinylidene fluorides, polyethylenes, polypropylenes, styrene-butadiene rubbers, acrylated styrene-butadiene rubbers, epoxy resins, nylons, and mixtures thereof.

3. The positive electrode of claim 1, wherein the conductive material comprises a material selected from the group consisting of carbon-based materials, metal-based materials, conductive polymers, and mixtures thereof.

4. A rechargeable lithium battery comprising:
   a positive electrode comprising a positive active material, a binder, and a conductive material, wherein a weight ratio of the binder and conductive material to the positive active material, ranges from 3:97 to 4:96, and a weight ratio of the binder to the conductive material ranges from 1.6 to 2:1;
   a negative electrode comprising a negative active material; and
   a non-aqueous electrolyte, and wherein the positive active material satisfies the following:

$$Li_xM_yO_{2-z}$$

wherein M is $Ni_{1-a-b}(Ni_{1/2}Mn_{1/2})_aCo_b$, $0.65 \leq a+b \leq 0.85$, and $0.1 \leq b \leq 0.4$,
   $0.95 \leq x \leq 1.05$,
   $x+y \approx 2$, and
   $0 \leq z \leq 0.05$.

5. The rechargeable lithium battery of claim 4, wherein the negative active material comprises a carbon-based material for reversibly intercalating and deintercalating lithium ions.

6. The rechargeable lithium battery of claim 4, wherein the binder comprises a material selected from the group consisting of polyvinylalcohol, carboxylmethylcelluloses, hydroxypropylcelluloses, diacetylcelluloses, polyvinylchlorides, carboxylated polyvinylchlorides, polyvinylfluorides, ethylene oxide-containing polymers, polyvinylpyrrolidones, polyurethanes, polytetrafluoroethylenes, polyvinylidene fluorides, polyethylenes, polypropylenes, styrene-butadiene rubbers, acrylated styrene-butadiene rubbers, epoxy resins, nylons, and mixtures thereof.

7. The rechargeable lithium battery of claim 4, wherein the conductive material comprises a material selected from the group consisting of carbon-based materials, metal-based materials, conductive polymers, and mixtures thereof.

8. A method of forming a positive electrode for a rechargeable lithium battery, the method comprising:
   mixing a positive active material, a binder, and a conductive material in a solvent to form a positive active material slurry; and
   coating the positive active material slurry on a metal-foil current collector to form the positive electrode,
   wherein a weight ratio of the binder and conductive material, and the positive active material, ranges from 3:97 to 5:95 wt %, and
   a weight ratio of the binder and the conductive material ranges from 1.5 to 3:1, and
   wherein the positive active material satisfies the following:

$$Li_xM_yO_{2-z}$$

wherein M is $Ni_{1-a-b}(Ni_{1/2}Mn_{1/2})_aCo_b$, $0.65 \leq a+b \leq 0.85$, and $0.1 \leq b \leq 0.4$,
   $0.95 \leq x \leq 1.05$,
   $x+y \approx 2$, and
   $0 \leq z \leq 0.05$.

9. The method of claim 8, wherein the binder comprises a material selected from the group consisting of polyvinylalcohols, carboxylmethylcelluloses, hydroxypropylcelluloses, diacetylcelluloses, polyvinylchlorides, carboxylated polyvinylchlorides, polyvinylfluorides, ethylene oxide-containing polymers, polyvinylpyrrolidones, polyurethanes, polytetrafluoroethylenes, polyvinylidene fluorides, polyethylenes, polypropylenes, styrene-butadiene rubbers, acrylated styrene-butadiene rubbers, epoxy resins, nylons, and mixtures thereof.

10. The method of claim 8, wherein the conductive material comprises a material selected from the group consisting of carbon-based materials, metal-based materials, conductive polymers, and mixtures thereof.

* * * * *

UNITED STATES PATENT AND TRADEMARK OFFICE
CERTIFICATE OF CORRECTION

PATENT NO. : 10,381,126 B2
APPLICATION NO. : 12/684868
DATED : August 13, 2019
INVENTOR(S) : Jin-Bum Kim It is certified that error appears in the above-identified patent and that said Letters Patent is hereby corrected as shown below:

In the Claims

Column 10, Line 27, Claim 8    delete "5:95" and
insert -- 4:96 --

Column 10, Line 29, Claim 8    delete "1.5 to 3:1," and
insert -- 1.6 to 2:1, --

Signed and Sealed this
Sixteenth Day of June, 2020

Andrei Iancu
*Director of the United States Patent and Trademark Office*